Sept. 14, 1937. A. C. MAUGHAN 2,093,134
SUGARCANE CUTTER
Filed Nov. 21, 1935

Inventor:
A. C. Maughan
By Glascock Downing & Seebold
Attorney

Patented Sept. 14, 1937

2,093,134

UNITED STATES PATENT OFFICE 2,093,134

SUGARCANE CUTTER

Alfred Clement Maughan, Bundaberg, Queensland, Australia

Application November 21, 1935, Serial No. 50,969
In Australia November 24, 1934

5 Claims. (Cl. 55—64)

When it is desired to cut organic material, such as sugar cane trash and tops, cow peas, other green crops, and such like, for the purpose of plowing it into the soil it is found difficult to do so, as, according to the various methods at present in vogue, use is made of the ground upon which to cut the organic material, but, as the ground is more or less yielding and lacks the necessary solidity, it is practically impossible to effectively cut the material. According to this invention the organic material is cut without using the ground in any way for cutting. The cutting is entirely mechanical and consequently the operation is more effective and the material is in a better condition for working into the soil. The object of this invention is the production of a device for attachment to a suitable implement, such as a disc or mould board plough, or to a frame built for the purpose and supported on land wheels. The implement or frame may be drawn by a tractor, horses, or other means of draught. The device is such that it cuts the organic material so that it can be readily and more or less completely covered by the soil.

In carrying out the invention a circular comb is rotatably carried in bearings on a frame and in close proximity to such comb is a vertical knife adjustably carried so that it bears against such comb with the desired pressure.

These and other details forming the invention and the application thereof will now be more fully described.

In order that the invention may be better understood it will now be more fully described with the aid of the accompanying drawing, in which Fig. 1 is a side elevation.

Figure 1:
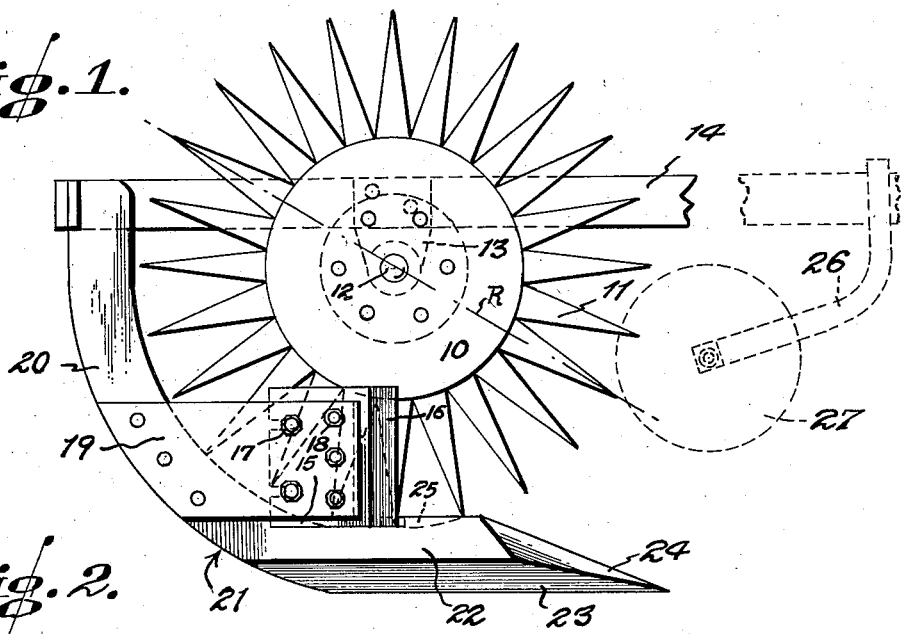
Figure 2:
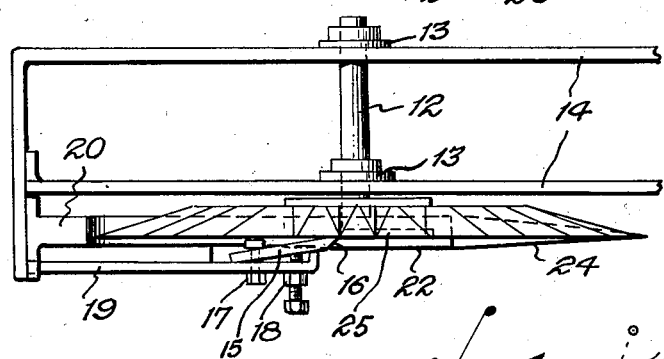
Fig. 2 is a plan view of Fig. 1.
Figures 3, 4:
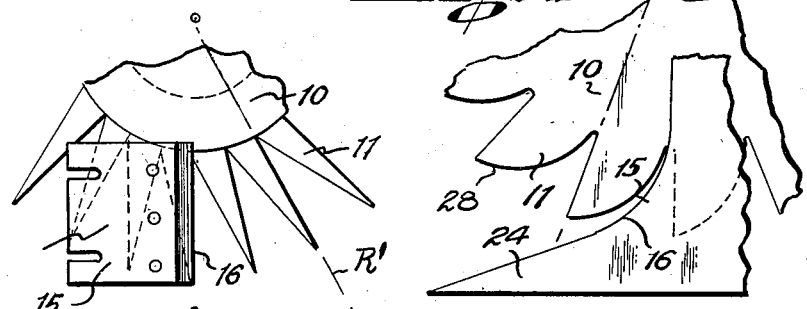
Fig. 3 is a fragmentary side elevation of a detail showing an alternative arrangement.
Fig. 4 is a fragmentary side elevation of a detail showing a further alternative arrangement.

The centre plate 10 of a circular comb formed of teeth 11 is rigidly secured to a shaft 12 rotatably carried in bearings 13 on a frame 14 and prevented from moving endwise. The frame 14 may be carried by land wheels and drawn by a tractor, horses, or other means of draught or it may form part of any farm implement, such as a disc or mouldboard plough. The shaft 12 is driven by sprocket wheels and chain, spur and/or bevel wheels and shafting, or other drive from the land wheel of the implement or tractor or from the tractor driving mechanism or self-contained motor unit. The teeth 11 of the rotary comb, which are rigidly secured to the centre plate 10, are triangular or otherwise suitably shaped and are flat on the working faces. The centre line of each tooth 11 may be radial, as shown at R in Fig. 1, or alternatively the trailing edge may be radial, as shown at R in Figs. 3 and 4, or the leading edge 28 curved, as shown in Fig. 4. The shaft 12 and consequently the rotary comb teeth 11 are driven at a ratio of speed suitable to the plane movement of the implement as found most desirable and advisable.

Adjacent the comb teeth 11 is a vertical (or curved) cutting plate 15 having a cutting edge 16 which bears against the teeth 11 of the comb. The cutting plate 15 is adjustably secured by bolts and nuts 17 and adjusting screws 18 to an arm 19, which in turn is carried by the arm 20.

This arm 19 also carries a shoe 21 having a flat side 22 and a V-shaped bottom 23. The fore part 24 of the shoe 21 is diamond pointed and a U-groove or rebate 25 is formed in the upper edge to just clear the points of the teeth 11 of the comb as they rotate. In some classes of machines this shoe 21 is omitted.

In some cases, as shown by dotted lines, a spring steel strip 26 is secured to the frame 14 or draw bar and sweeps down in front of the shoe 21 where it is provided with one or a pair of wheels 27 which exert pressure when the organic matter begins to drag.

The device as described is carried by a suitable frame 14, which is adjustably carried on a convenient part of the implement and suitable known means are provided for raising and lowering same so that the leading point of the shoe may be pushed under the organic material and over the soil so as to remove stones, facilitate cutting, and subsequently turn over into the soil.

The materials of which the device is made are those best suited for the respective purposes and the details of construction and method and adjustment of support may be varied as desired.

In operation the device, whether as a unit on a frame or carried on an ordinary farm implement such as a plough, is drawn across the field which is covered, say, with trash. The teeth 11 of the comb, as the latter is mechanically rotated or by reason of the contact of the teeth with the soil, walk along, as it were, the sharp points dividing or piercing the trash, and as the comb rotates holds it until cut by the vertical cutter.

The term "sugar cane cutter" in the claims is intended to include devices used for cutting any kind of similar organic matter.

Having now particularly described and ascertained the nature of my said invention and in what manner the same is to be performed, I declare that what I claim is:—

1. A sugar cane cutter comprising a rotatable circular comb, a frame, bearings thereon, a shaft running in said bearings, a bracket on the frame, a vertical cutting plate adjustably carried on said bracket against said circular comb, and a pointed shoe attached to said bracket.

2. A sugar cane cutter comprising a rotatable circular comb, a frame, bearings thereon, a shaft running in said bearings, a bracket on said frame, and a vertical cutting plate adjustably carried on said bracket against said circular comb.

3. A device according to claim 1 in which said comb is provided with teeth the center lines of which are radial.

4. In a device according to claim 1 in which said comb is provided with teeth the trailing edges of which are radial.

5. In a device according to claim 1 in which said comb is provided with teeth the leading edges of which are curved.

ALFRED CLEMENT MAUGHAN.